(12) United States Patent
Wu

(10) Patent No.: US 10,573,473 B2
(45) Date of Patent: Feb. 25, 2020

(54) GAME JOYSTICK SWITCH ASSEMBLY

(71) Applicant: DONGGUAN CITY KAIHUA ELECTRONICS CO., LTD, Dongguan, Guangdong (CN)

(72) Inventor: Fuxi Wu, Guangdong (CN)

( * ) Notice: Subject to any disclaimer, the term of this patent is extended or adjusted under 35 U.S.C. 154(b) by 0 days.

(21) Appl. No.: 15/880,901

(22) Filed: Jan. 26, 2018

(65) Prior Publication Data

US 2018/0174783 A1    Jun. 21, 2018

Related U.S. Application Data

(63) Continuation of application No. PCT/CN2016/090863, filed on Jul. 21, 2016.

(30) Foreign Application Priority Data

Jul. 27, 2015    (CN) ..................... 2015 2 0546610 U

(51) Int. Cl.
*H01H 25/04*    (2006.01)
*A63F 13/24*    (2014.01)
(Continued)

(52) U.S. Cl.
CPC ............. *H01H 25/04* (2013.01); *A63F 13/24* (2014.09); *G05G 9/047* (2013.01); *G05G 9/06* (2013.01);
(Continued)

(58) Field of Classification Search
CPC ...... H01H 25/04; H01H 25/065; H01H 21/12; H01H 1/26; A63F 13/24; G05G 9/047;
(Continued)

(56) References Cited

U.S. PATENT DOCUMENTS 6,445,377 B1 *    9/2002    Shimomura ........... G05G 9/047
                                                                   345/161
6,570,107 B1 *    5/2003    Nishimoto ............. H01H 25/06
                                                                   200/6 A
(Continued)

FOREIGN PATENT DOCUMENTS

CN    204792582    11/2015
JP    2007059159    3/2007

OTHER PUBLICATIONS

Written Opinion and International Search Report for International application No. PCT/CN2016/090863, dated Oct. 27, 2016; 10 pages (English and Chinese).

*Primary Examiner* — Edwin A. Leon
*Assistant Examiner* — Lheiren Mae A Caroc
(74) *Attorney, Agent, or Firm* — ZANIP

(57) ABSTRACT

A game joystick switch assembly, includes a base, defining positioning holes; a joystick base movably mounted on the base; a joystick located on the joystick base; a first coupled member defining a slit aperture; a second coupled member arranged in an orthogonal direction relative to the first coupled member, and defining an elongated groove; a housing, defining a first through opening, positioning columns formed on the housing; a first electronic component; a second electronic component; and a metal fixing bracket including a main body, a second through opening in accordance with the first through opening for the joystick to stick out, four pins and side pins, and a containing space; wherein the housing and the base are received in the containing space, the housing and the base are positioned and combined by the positioning columns and the positioning holes.

7 Claims, 11 Drawing Sheets

(51) Int. Cl.
*G05G 9/047* (2006.01)
*G05G 9/06* (2006.01)
*H01H 25/06* (2006.01)
*H01H 1/26* (2006.01)
*H01H 21/12* (2006.01)

(52) U.S. Cl.
CPC . *H01H 25/065* (2013.01); *G05G 2009/04703* (2013.01); *G05G 2009/04744* (2013.01); *H01H 1/26* (2013.01); *H01H 21/12* (2013.01)

(58) Field of Classification Search
CPC ........... G05G 9/06; G05G 2009/04703; G05G 2009/04744
USPC .............................. 200/4, 6 A, 6 R
See application file for complete search history.

(56) References Cited

U.S. PATENT DOCUMENTS 6,989,497 B1    7/2006  Lee
7,199,314 B2 *  4/2007  Huang ............... G05G 9/04796
                                                200/6 A \* cited by examiner

GAME JOYSTICK SWITCH ASSEMBLY

This application is a continuation of International Patent Application No. PCT/CN2016/090863, filed on Jul. 21, 2016, which claims priority to Chinese Patent Application No. 201520546610.1, filed with the Chinese Patent Office on Jul. 27, 2015, and entitled "Novel Game Joystick Switch", both of the aforementioned patent applications are herein incorporated by reference in their entireties.

TECHNICAL FIELD

The present invention relates to rocker switch technical field, and more particularly, to a new type of game joystick switch.

BACKGROUND

With improvement of living standards, spare time activities of people are getting more and more abundant and colorful. electronic game devices incorporating entertainment, development of intelligence, cultivating EQ, health and fitness are getting more and more popular. As an important part of an electronic game device, the game joystick switches are critical assembly unit for the people experiencing electronic games.

In prior art, a conventional game joystick switch includes a frame bracket, a first movable piece erecting in the frame bracket and rotatably mounted thereon, a second movable piece extending along a direction orthogonal to longitudinal direction of the first movable piece and erecting in the frame bracket and rotatably mounted thereon, a rocker lever capable of tilting motion and protruding out from the frame bracket, a rocker lever base movable and arranged along axis line of the rocker lever, and a base mounted under the frame bracket. A reset spring is provided between the rocker lever and the rocker lever base. The reset spring is configured to fulfill reset operation to the rocker lever. Electronic members are mounted on a housing.

The conventional game joystick switch has the following defects: first, with development of technology, precision requirement for the people of the game joystick switch is getting higher. While in the conventional switch, due to touch connection of the reset spring and the rocker lever, resilience of the reset spring is insufficient to make the rocker lever have a sufficient restoration, thereby resulting in a low operation accuracy. Second, the electronic members are fixed on the housing outside the frame bracket, thereby the electronic members are obviously bulged thereon, resulting in a product in large size, impeding developing small product. Third, the base is fixed on the housing by snap-fit of buckle point and buckle hole, with which combination is not tightened, with a lot of accessories and a complicated structure, and inconvenient installation.

SUMMARY

Technical problem to be solved by embodiment of the present invention is to provide a novel game joystick switch with tightened combination, miniaturized product, higher operation accuracy, less accessories, simple structure, and convenient installation.

one embodiment of the present invention provides a game joystick switch assembly, includes a base including a bottom plate, a front side wall, a rear side wall, a left side wall, and a right side wall respectively extending upward from rims of the bottom plate, positioning holes respectively defined at four corners of the base; a joystick base, movably mounted on the base; a joystick, located on the joystick base; a reset spring; a first coupled member, rotatably mounted on the base, bent in an arch shape, defining a slit aperture along a lengthwise direction; a second coupled member, rotatably mounted on the base, located under the first coupled member, arranged in an orthogonal direction relative to the first coupled member, and defining an elongated groove; a button switch; a housing, mounted on the base, defining a first through opening in an axial direction for the joystick to stick out, positioning columns formed on the housing assembled with the positioning holes; a first electronic component; a second electronic component; and a metal fixing bracket, including a main body, a second through opening defined in the main body in accordance with the first through opening for the joystick to stick out, four pins and side pins provided at four corners of the main body, and a containing space defined between the main body and the side pins; wherein, the joystick upwardly gets through the elongated groove and the slit aperture, the housing is embraced by the metal fixing bracket, the housing and the base are received in the containing space, the housing and the base are positioned and combined by the positioning columns and the positioning holes, the first electronic component and the second electronic component are mounted on the base inside the housing.

In further improvement of the above embodiment, the left side wall outwardly extends and defines a receiving space, the button switch is mounted in the receiving space, the button switch is integrated with the base or separated with the base.

In further improvement of the above embodiment, a groove is defined in the joystick base, a accommodation cavity is defined in the joystick, the reset spring is arranged in the groove and the accommodation cavity.

In further improvement of the above embodiment, a first support and a second support are formed on the base, a first extension arm and a second extension arm are respectively extended form two ends of the first coupled member, one end of the first coupled member is supported on the first support, the second extension arm is rested on the second support.

In further improvement of the above embodiment, a third support is formed on the base, a contact portion is outwardly formed from a side wall of the second coupled member in a longitudinal direction, a lug boss is outwardly extended from another side wall, the lug boss is rested on the third support, the contact portion is above the button switch.

In further improvement of the above embodiment, a first mounting slot and a second mounting slot are defined in the base, the first electronic component and the second electronic component are respectively plugged in the first mounting slot and the second mounting slot.

In further improvement of the above embodiment, the joystick base is in a upside down T shape, the joystick base includes a base plate and a shaft upwardly formed from center position of the base plate, a shoulder portion is formed on the base plate extended in a circumferential direction, the groove is defined between the shoulder portion and the shaft, a shaft hole is defined in the joystick, the shaft is plugged in the shaft hole, the accommodation cavity is defined in bottom of the joystick concaved upwards.

In further improvement of the above embodiment, slots are defined through two side walls of the second coupled member in a transverse direction, protruded shaft supports are formed on two opposite side walls on the joystick, the shaft supports are spliced by two arc-shaped structures with the same diameter, and the shaft support is assembled with the slot.

In further improvement of the above embodiment, the first electronic component is a carbon-film potentiometer, the first electronic component includes a first substrate and a first rotating part, the first substrate is located in the housing, the first rotating part are mounted on the first extension arm, the second electronic component is a carbon-film potentiometer, the second electronic component includes a second substrate and a second rotating part, the second substrate is in the housing, an arm portion are extended from the lug boss, the second rotating part are mounted on the arm portion.

Comparing to the prior art, some effective results of the embodiments are listed below:

(1) By means of riveting a metal fixing bracket outside the housing to accommodate the housing and the base, and by means of riveting four side pins, two parts are firmly assembled, and the housing and the base can be made in smaller size. Moreover, positioning pins and positioning holes are provided on the housing 70 and in the base at the corners, accurate positioning and assembly between the housing and the base are achieved by the positioning columns and positioning holes. Due to no buckles and buckle points needed, products are made having compact structure and miniaturized size. The metal fixing bracket has four pins capable of being riveted with a PCB board, to make the game joystick switch firmly fixed onto the PCB board, to build a tight connection between parts of products.

(2) The left side wall outwardly extends and defines a receiving space, and a button switch is mounted in the receiving space. The button switch can be integrated with the base or can be separated with the base. In a preferred embodiment, the two components are designed as an integral component, to reduce component number, simplifying product manufacturing procedure, so as to achieve a new design with easy installation and compact structure in entirety.

(3) A groove is defined in the joystick base. An accommodation cavity is defined in the joystick. The reset spring is disposed in the groove and in the accommodation cavity, so as to achieve an inner installation of electronic parts, to take full resilient advantage of the reset spring, to have higher operating accuracy, and further to achieve miniaturized products.

(4) A first electronic component and a second electronic component are both mounted on the base in the housing, so as to achieve an inner installation of electronic parts, to have a convenient installation, to have an compact structure, and to achieve miniaturized products.

DETAILED DESCRIPTION

Figure 1:
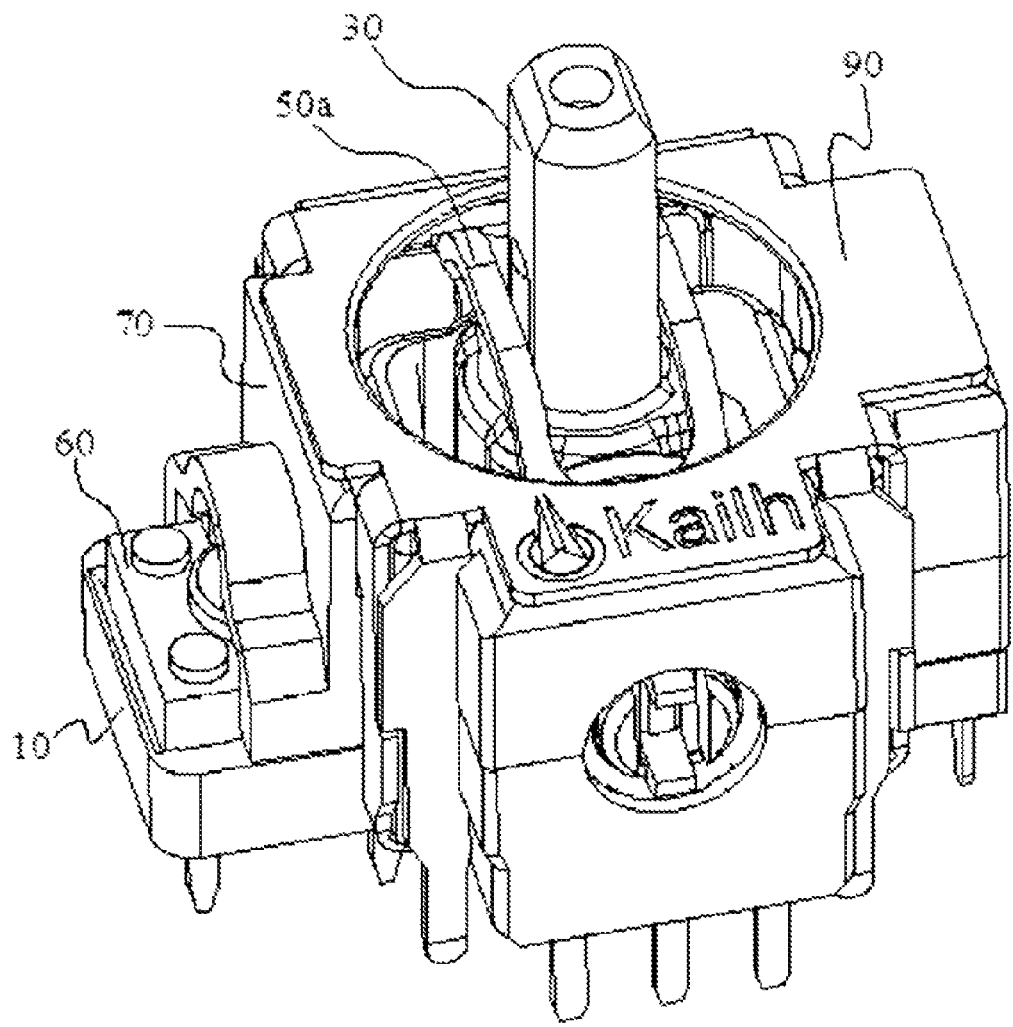
FIG. 1 is a perspective view of a game joystick switch in a preferred embodiment of the present utility design.
Figure 2:
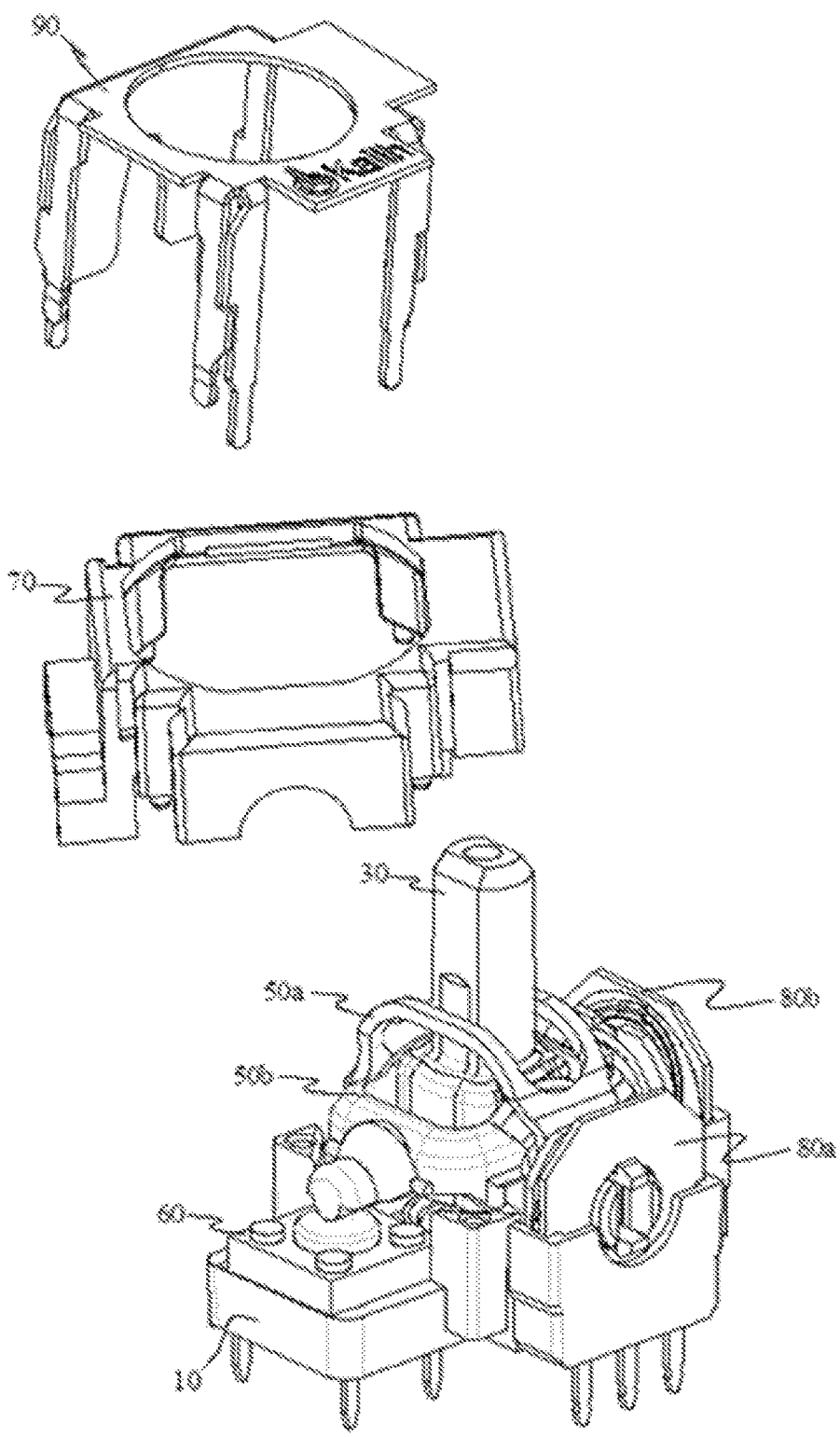
FIG. 2 is an exploded view of the game joystick switch in the preferred embodiment of the present utility design.
Figure 3:
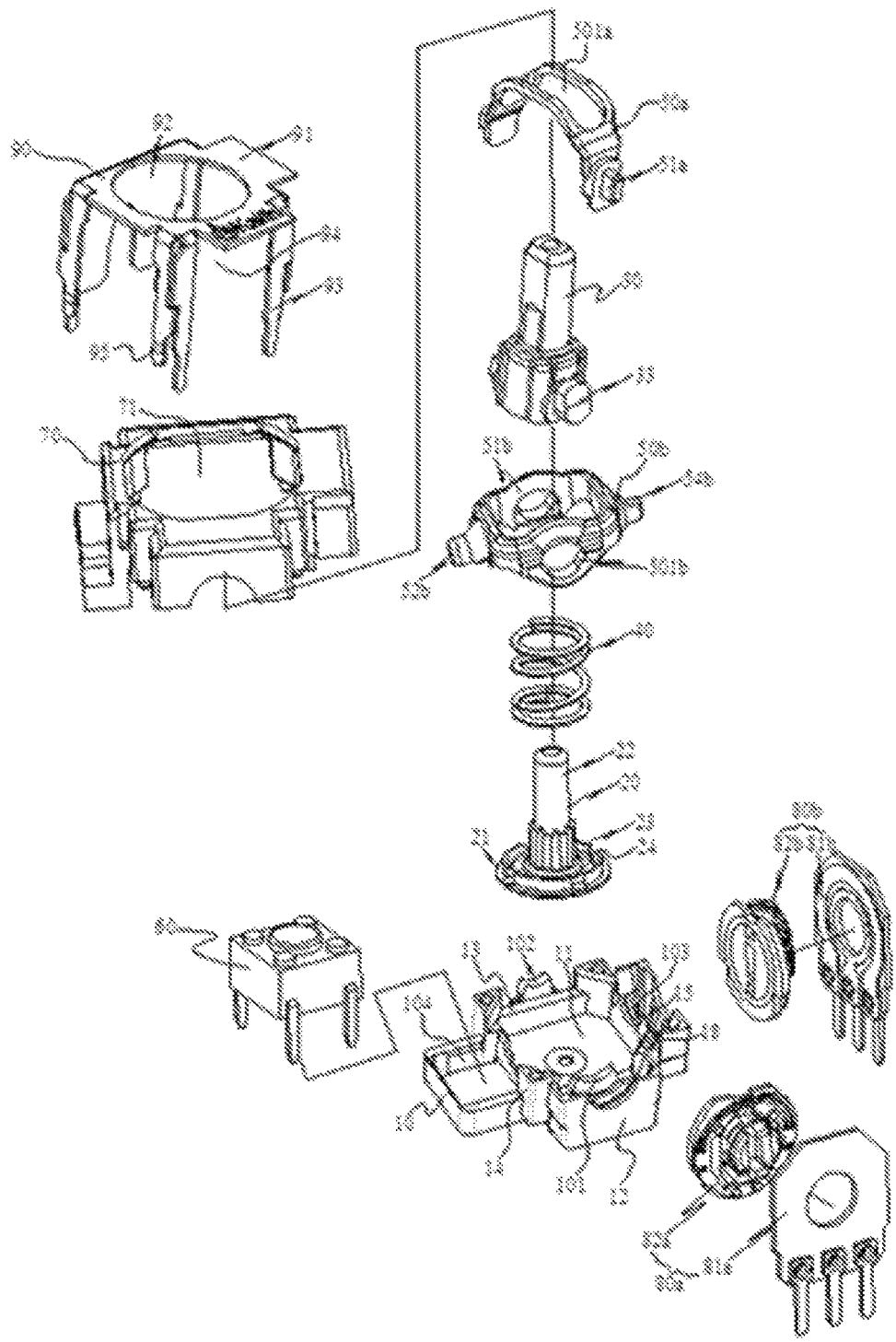
FIG. 3 is an explosive view of the game joystick switch in the preferred embodiment of the present utility design.
Figure 4:
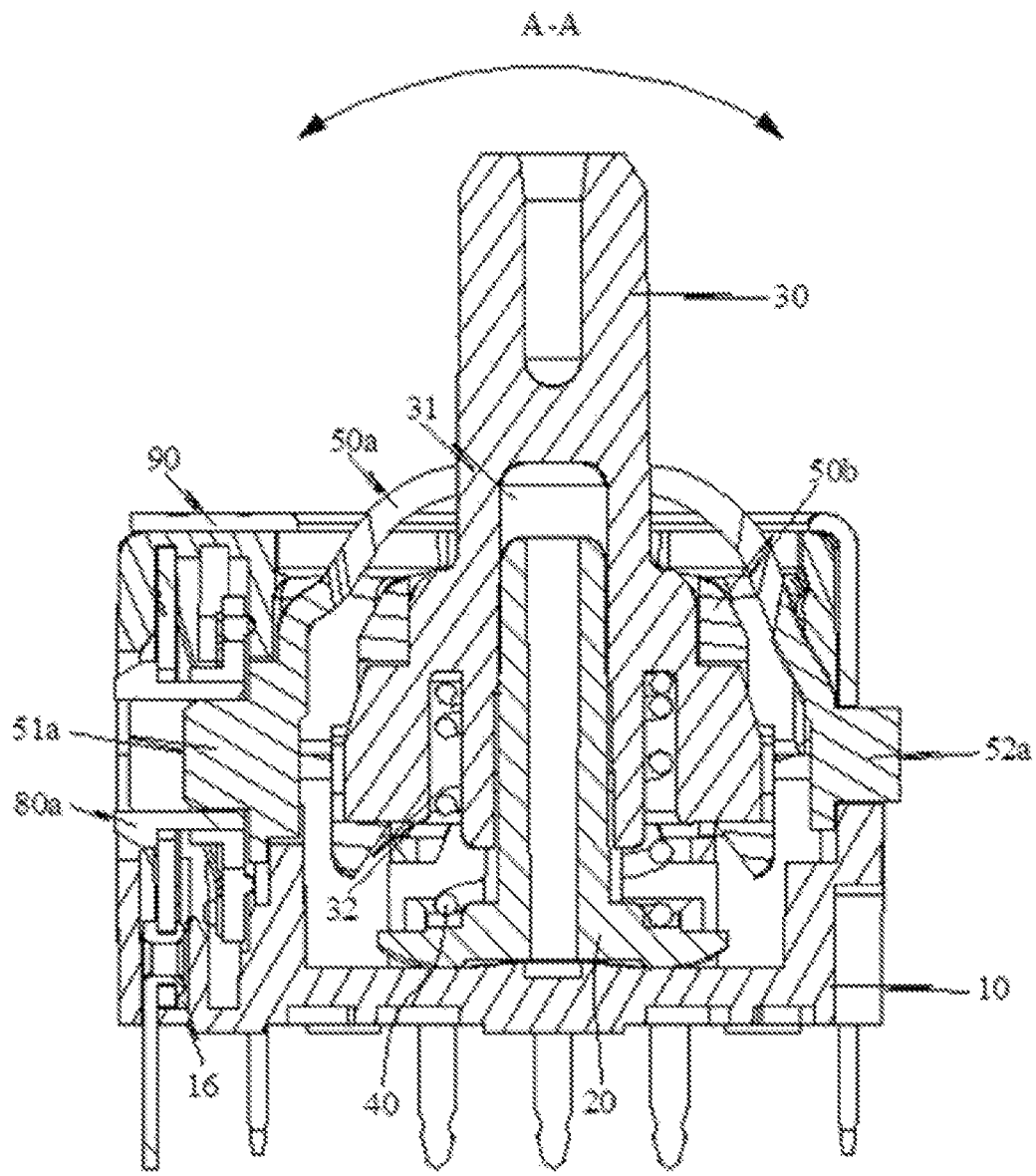
FIG. 4 is a sectional view of the game joystick switch in the preferred embodiment of the present utility design.
Figure 5:
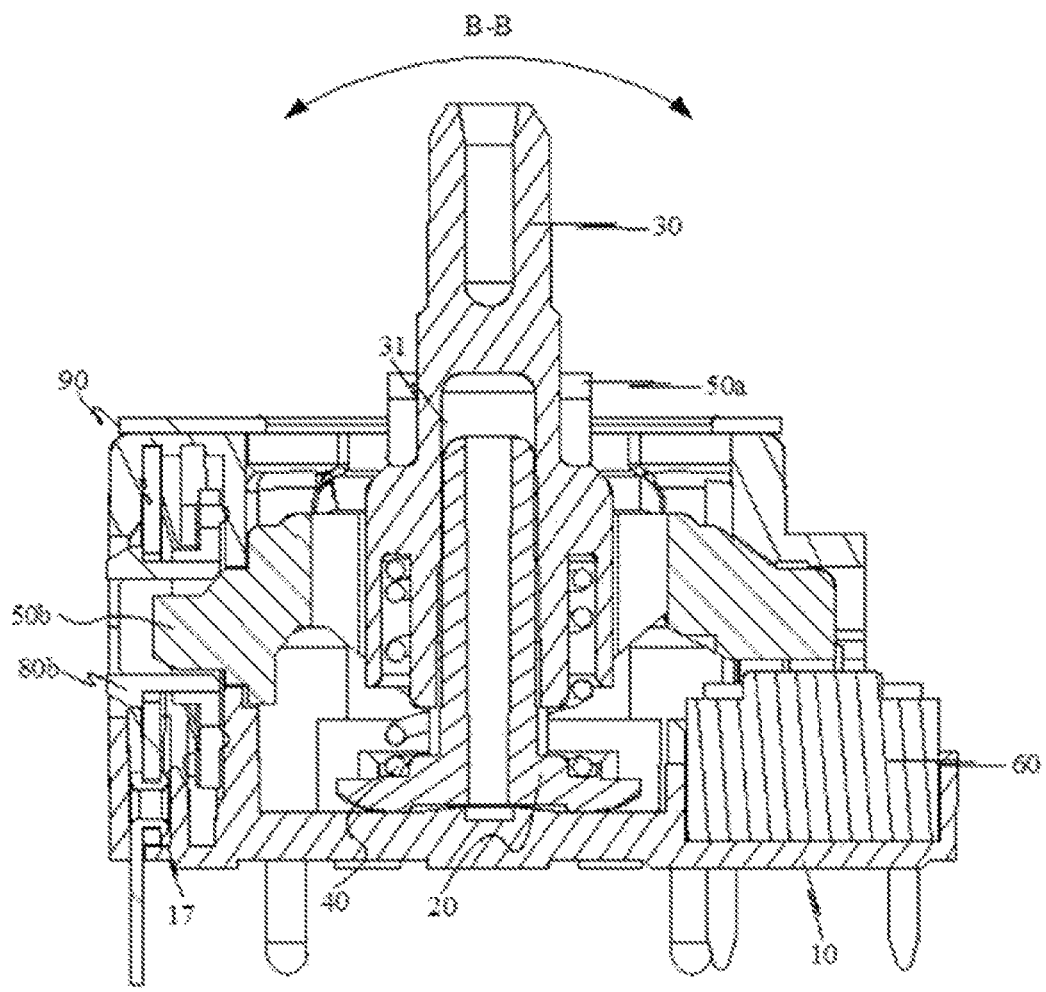
FIG. 5 is a sectional view from another angle of view.
Figure 6:
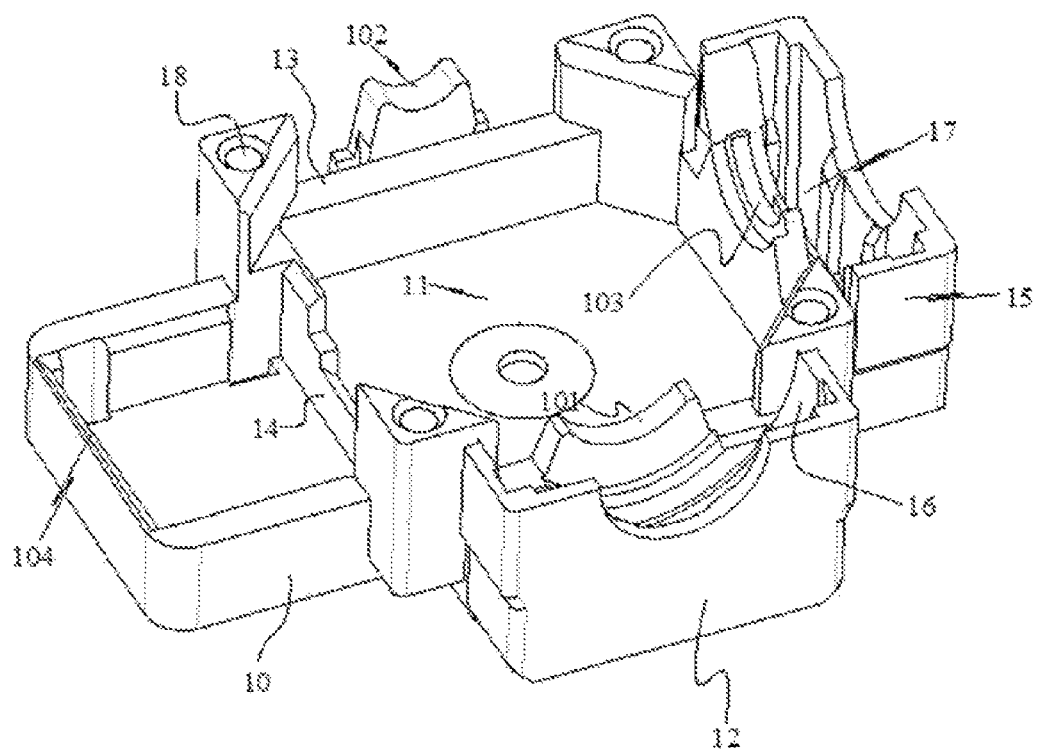
FIG. 6 is a structure diagram of a base of the game joystick switch in the preferred embodiment of the present utility design.
Figure 7:
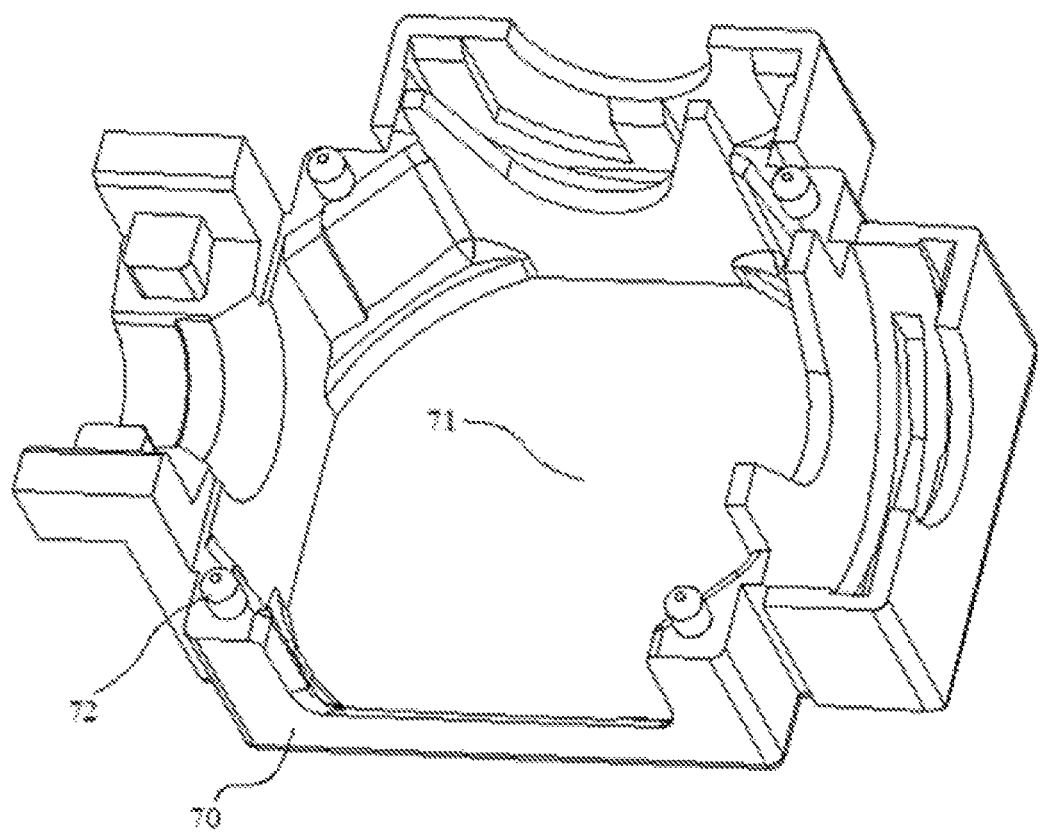
FIG. 7 is a structure diagram of a housing of the game joystick switch in the preferred embodiment of the present utility design.
Figure 8:
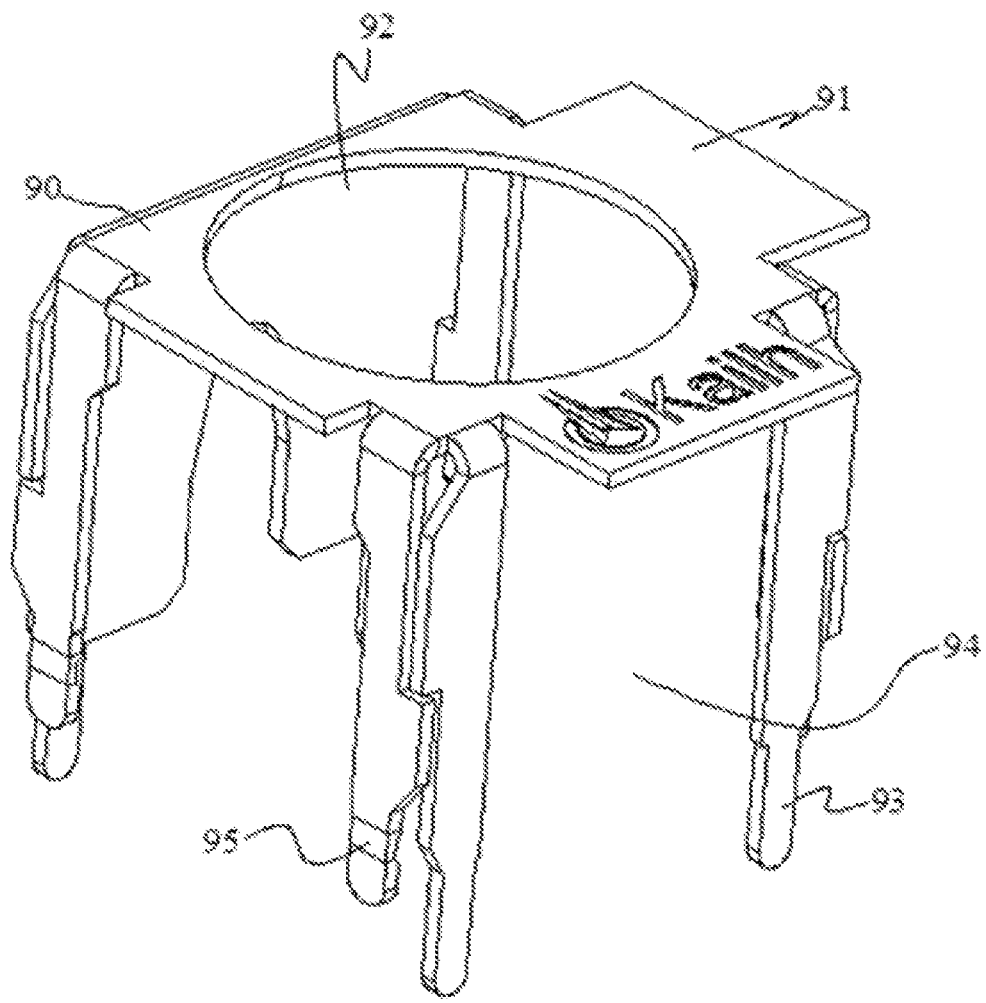
FIG. 8 is a structure diagram of a metal fixing bracket of the game joystick switch in the preferred embodiment of the present utility design.
Figure 9:
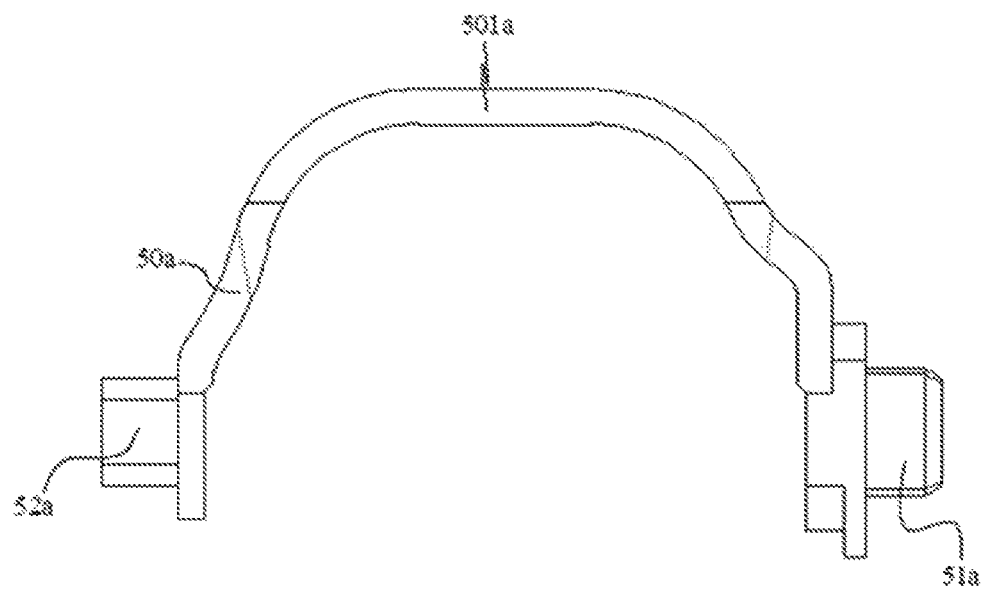
FIG. 9 is a structure diagram of a first coupled member of the game joystick switch in the preferred embodiment of the present utility design.
Figure 10:
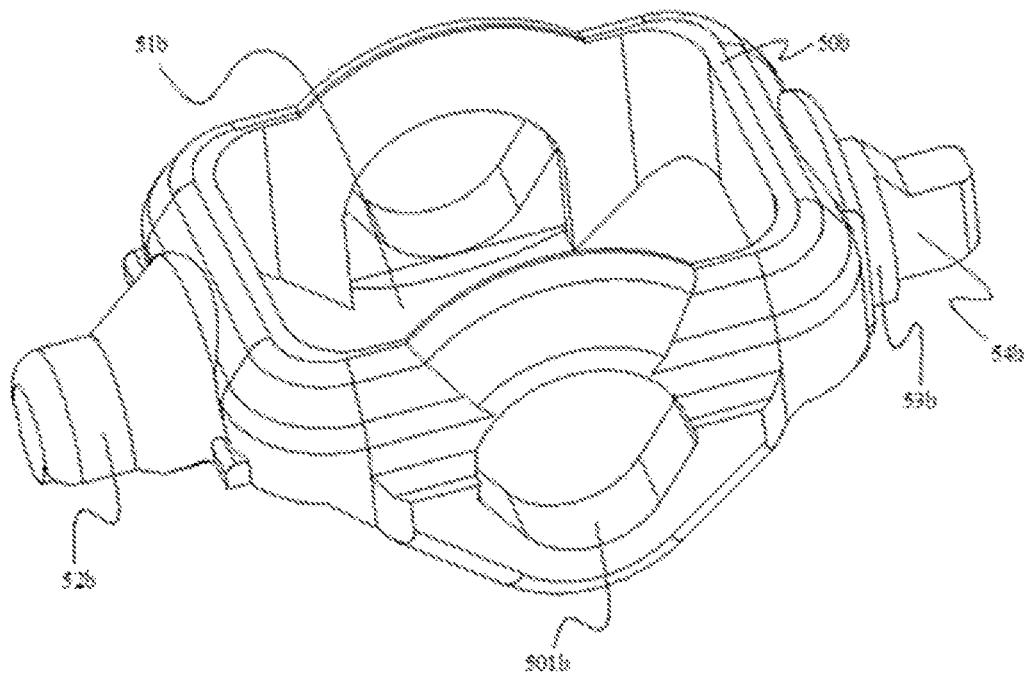
FIG. 10 is a structure diagram of a second coupled member of the game joystick switch in the preferred embodiment of the present utility design.
Figure 11:
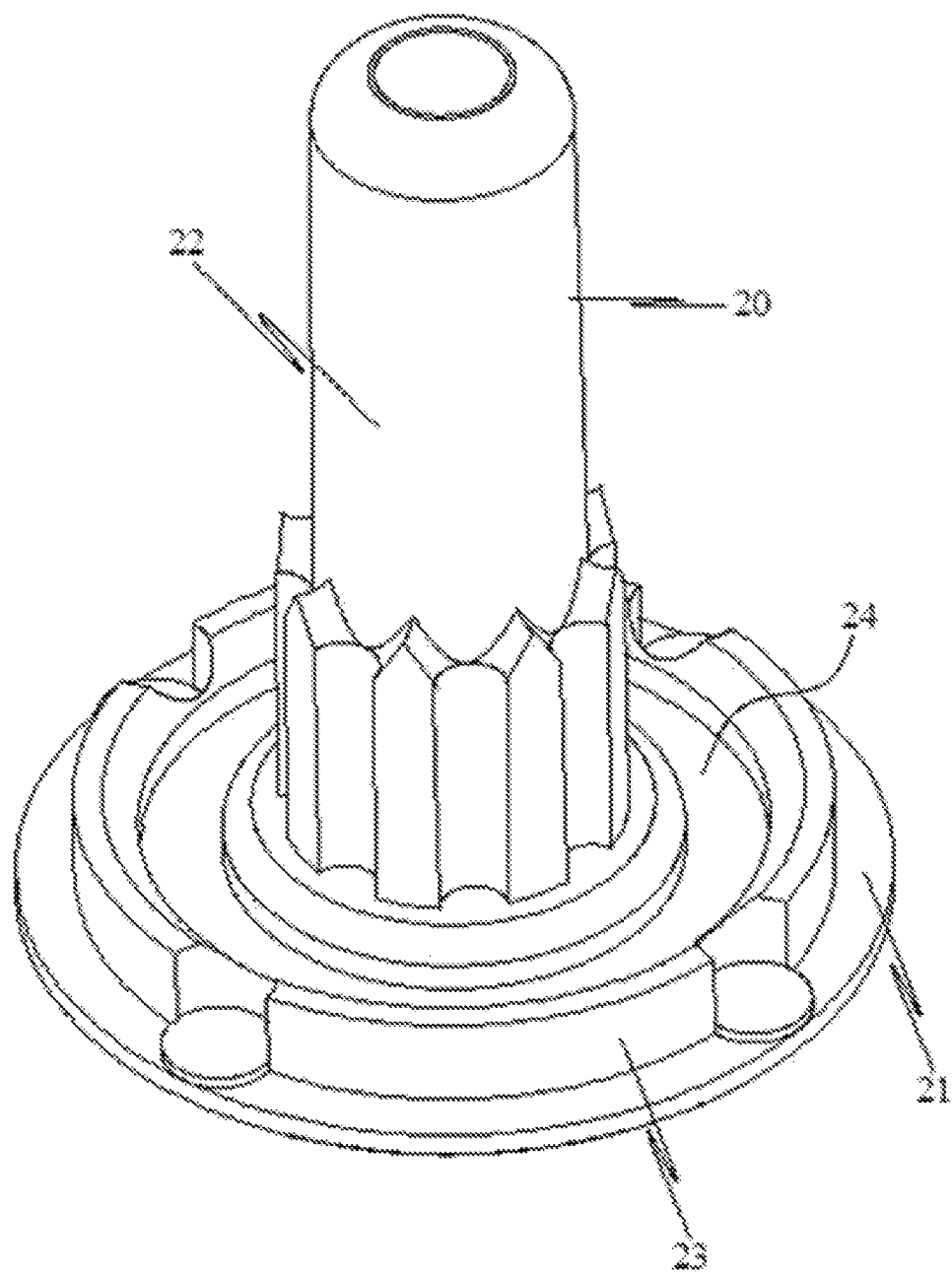
FIG. 11 is a structure diagram of a joystick base of the game joystick switch in the preferred embodiment of the present utility design.
Figure 12:
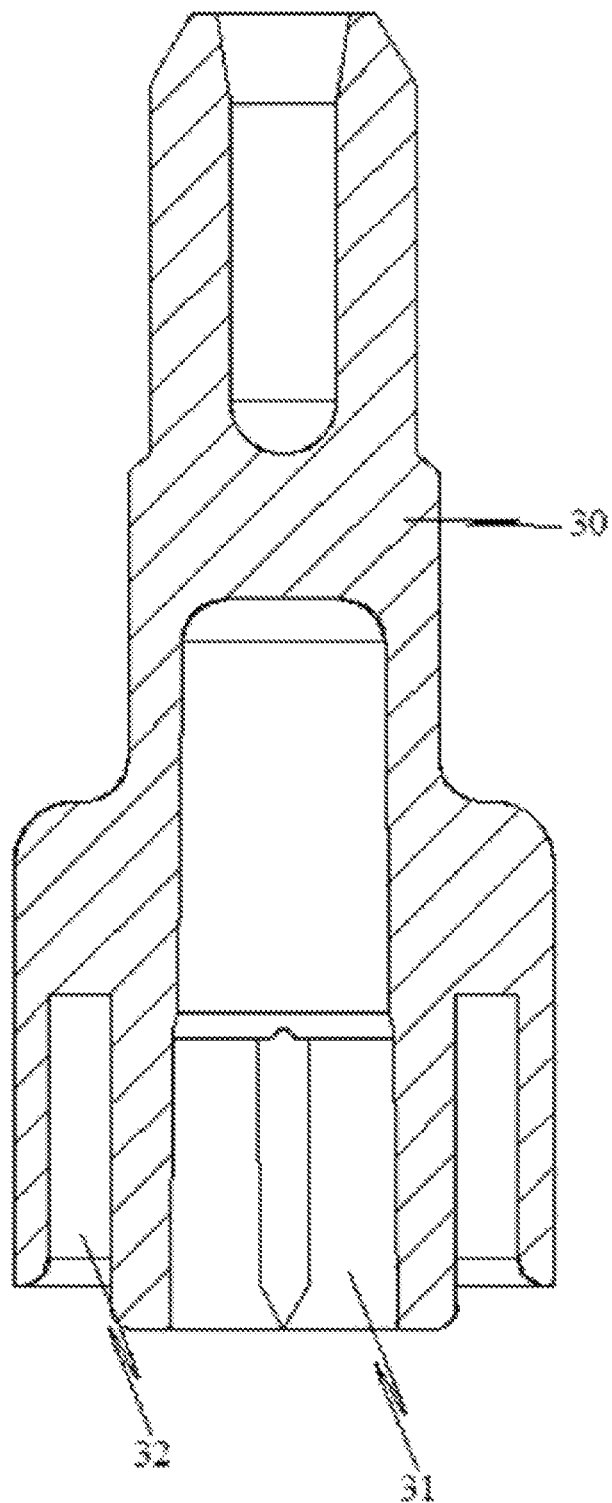
FIG. 12 is a structure diagram of a joystick of the game joystick switch in the preferred embodiment of the present utility design.

Together with drawings of the embodiments of the present invention, explanations are elaborated with reference to the exemplary embodiments of the present invention as follows.

As shown in 1~12, a perspective view, a exploded view, an explosive view, a sectional view, a structure diagram of a base, a structure diagram of a housing, a structure diagram of a metal fixing bracket, a structure diagram of a first coupled member, a structure diagram of a second coupled member, a structure diagram of a joystick base, and a structure diagram of a joystick of the present utility design in preferred embodiment are respectively shown thereon.

The novel game joystick switch 100 includes a base 10, a joystick base 20, a joystick 30, a reset spring 40, a first coupled member 50a, a second coupled member 50b, a button switch 60, a housing 70, a first electronic component 80a, and a second electronic component 80b. The housing 70 is riveted with a metal fixing bracket 90 outside. the fixing bracket 90 includes a main body 91, a second through opening 92 defined in the main body 91 corresponding to the first through opening 71 for the joystick 30 to stick out, four pins 93 and four side pins 95 arranged at four corners of the main body 91, and a containing space 94 defined between the main body 91 and the side pins 95. The housing 70 and the base 10 are received in the containing space 94.

Upturned positioning holes 18 are respectively defined at four corners of the base 10, base 10, positioning column 72, positioning columns 72 facing down are formed on the housing 70 assembled with the positioning holes 18 corresponding to locations of the positioning hole 18. The housing and the base are positioned and combined by the positioning columns 72 and the positioning holes 18.

By means of riveting a metal fixing bracket 90 outside the housing 70 to accommodate the housing 70 and the base 10, and by means of riveting the side pins 95 to make the two parts tightly assembled, and to make the base 10 and the housing 70 smaller thereby achieving miniaturized product. In addition, the positioning column 72 and the positioning hole 18 are respectively provided on the housing 70 and in the base 10 at the corners, accurate positioning and assembly between the housing 70 and the base 10 are achieved by the positioning columns 72 and positioning holes 18. Due to no design of buckles and buckle points, products are made with compact structure and miniaturized size. Four pins 93 are provided on the metal fixing bracket 90, capable of being soldered a PCB board, to firmly fix the game joystick switch on the PCB board, thereby combination between parts of the product are tight and fastened.

The base 10 includes a bottom plate 11, a front side wall 12, a rear side wall 13, a left side wall 14 and a right side wall 15 respectively extending upward from rims of the bottom plate 11. The left side wall 14 outwardly extends and defines a receiving space 104, and a button switch is mounted in the receiving space 104. The button switch 60 can be integrated with the base 10 or can be separated with the base 10. In a preferred embodiment, the two components are designed as an integral component, to reduce component number, simplifying product manufacturing procedure, so as to achieve a new design with easy installation and compact structure in entirety.

The first electronic component 80a and the second electronic component 80b are both arranged on the base 10 in the housing 70. By means of disposing the first electronic component 80a and the second electronic component 80b both on the base 10 in the housing 70, the novel utility design ban be easy to assemble, and compact in structure in entirety, further miniaturized in product design.

A first support 101 and a second support 102 are formed on the base 10. A first extension arm 51a and a second extension arm 52a are respectively extended form two ends of the first coupled member 50a. One end of the first coupled member 50a is supported on the first support 101, the second extension arm 52a is rested on the second support 102.

A third support 103 is formed on the base 10, a contact portion 52b is outwardly formed from a side wall of the second coupled member 50b in a longitudinal direction. A lug boss 53b is outwardly extended from another side wall, and the lug boss 53b is rested on the third support 103, the contact portion 52b is above the button switch 60.

A first mounting slot 16 and a second mounting slot 17 are defined in the base 10. The first electronic component 80a and the second electronic component 80b are respectively plugged in the first mounting slot 16 and the second mounting slot 17.

The first coupled member 50a and the second coupled member 50b are both rotatably mounted on the base 10, and the second coupled member 50b is located under the first coupled member 50a arranged in an orthogonal direction to the first coupled member 50a.

The joystick base 20 is in an upside down T shape. The joystick base 20 includes a base plate 21 and a shaft 22 upwardly formed from center position of the base plate 21. A shoulder portion 23 is formed on the base plate 21 extended in a circumferential direction. A groove 24 is defined between the shoulder portion 23 and the shaft 10. A shaft hole 31 is defined in the joystick 30, and the shaft 22 is plugged in the shaft hole 31. An accommodation cavity 32 is defined in bottom of the joystick 30 concaved upwards.

Slots 501b are defined through two side walls of the second coupled member 50b in a transverse direction. Protruded shaft supports 33 are formed on two opposite side walls on the joystick 30. The shaft supports 33 are spliced by two arc-shaped structures with the same diameter, and the shaft support 33 is assembled with the slot 501b.

The first electronic component 80a is a carbon-film potentiometer, and the first electronic component 80a includes a first substrate 81a and a first rotating part 82a. The first substrate 81a is located in the housing 70, and the first rotating part 82a is mounted on the first extension arm 51a. The second electronic component 80b is a carbon-film potentiometer, and the second electronic component 80b includes a second substrate 81b and a second rotating part 82b. The second substrate 81b is in the housing 70. An arm portion are extended from the lug boss 53b. The second rotating part 82b is mounted on the arm portion.

The first coupled member 50a is bent in an arch shape, defining a slit aperture 501a along a lengthwise direction. The second coupled member 50b defines an elongated groove 51b. The joystick base 20 is movably mounted on the base 10, the joystick 30 is located on the joystick base 20, and the joystick 30 upwardly gets through the elongated groove 51b and the slit aperture 501a successively.

A groove 24 is defined in the joystick base 20. An accommodation cavity 32 is defined in the joystick 30. The reset spring 40 is arranged in the groove 24 and in the accommodation cavity 32, so as to achieve an inner installation of electronic parts, to take full resilient advantage of the reset spring 40, to have higher operating accuracy, and further to achieve miniaturized products.

The housing 70 is mounted on the base 10. The housing 70 defines a first through opening 71 in an axial direction for the joystick 30 to stick out.

Assembly process of the utility design in present embodiment is described as follows:

First, the button switch 60 in received in the receiving space; then the joystick base 20 is movably disposed on the base 10, with the reset spring 40 placed into the groove 24. Next, assemble the shaft hole 31 with the shaft 22, to make the shaft 22 be inserted into the shaft hole 31, with the reset spring 40 in the receiving chamber. Then, the second coupled member 50b is disposed on the base 10, with the slot 501b assembled with the shaft supports 33, and with the lug boss 53b of the second coupled member 50b rested on the third support 103. After that, the first coupled member 50a is disposed above the second coupled member 50b, keeping the second coupled member 50b orthogonal with the first coupled member 50a, with one end portion of the first coupled member 50a rested on the first support 101, and with the second extension arm 52a rested on the second support 102. Next, the first electronic component 80a is arranged on the base 10, i.e., the first electronic component 80a is disposed on the first extension arm 51a of the first coupled member 50a. The second electronic component 80b is arranged on the base 10 too, with the second electronic component 80b disposed on arm portion of the second coupled member 50b. After that the housing 70 is mounted on the base 10, with the base 10 and the housing 70 positioned and assembled by connection of the positioning hole 18 and the positioning column 72. In the end, the metal fixing bracket 90 is riveted outside the housing 70 by means of riveting the side pins 95 with the base 10 and the housing 70, and by means of riveting the pins 93 to fixing the game joystick switch 100 onto the PCB board.

Working principle of the utility design in present embodiment is described as follows:

In working process, when the joystick 30 are pressed down, accordingly, the shaft supports 33 exerts the second coupled member 50b a down force pressure to make the second coupled member 50b tilt and move based on the third support 103 as a fulcrum. The contact portion 52b moves downwards to press the button switch 60, fulfilling a conducting state of the switch. When the joystick 30 is loosed, the second coupled member 50b is restored to the normal position under resilient force of the reset spring 40, with detaching of the contact portion 52b from the button switch 60, thereby achieving a non-conducting state of the switch. When the joystick 30 is titled and moved along an A-A direction, the second coupled member 50b rotates based on the third support 103 as a fulcrum. When the joystick 30 is titled and moved along a B-B direction, the first coupled member 50a rotates based on the first support 101 and the second support 102 as a fulcrum.

In conclusion, the essential feature of the present embodiment of the utility design is by means of riveting a metal fixing bracket 90 outside the housing 70 to receive the housing 70 and the base 10 to set a tight connection between the two parts, reducing size of the base 10 and the housing 70, and fulfilling miniaturized products. Moreover, the positioning columns 72 and the positioning holes 18 are provided on corners of the housing 70 and the base 10, carrying out accurate positioning and assembly between the housing 71 and the base 10 by the positioning columns 72 and the positioning holes 18. Due to no buckles and buckle points needed, compact product structure and miniaturized products are realized. The metal fixing bracket 90 has four pins 93 capable of being riveted with a PCB board, to make the game joystick switch firmly fixed onto the PCB board, to build up a tight connection between parts of the products. In addition, the first electronic component 80a and the second electronic component 80b are both disposed on the base 10 in the housing 70, to fulfil an inner installation of electronic components, to provide a convenient installation in the utility design, and to provide a compact structure in entirety. The groove 24 are defined in the joystick base 20, and the accommodation cavity 32 is defined in the joystick 30, the reset spring 40 is disposed in the groove 24 and in the accommodation cavity 32, to take full resilient advantage of the reset spring 40, and to have higher operating accuracy.

What described above are only the preferred embodiments of the present disclosure and are not intended to limit the present disclosure. Obviously, the detailed and concrete described embodiments are for illustration purpose, and should not be construed as limitations of the present invention. Any modifications, equivalent replacements, and alterations made within the spirits and principles of the present disclosure shall be included in the scope of the present disclosure. Therefore, construing of the protecting scope of the present invention refers to accompanying claims.

The invention claimed is:
1. A game joystick switch assembly, comprising
a base, comprising a bottom plate, a front side wall, a rear side wall, a left side wall, and a right side wall respectively extending upward from rims of the bottom plate, positioning holes respectively defined at four corners of the base;
a joystick base, movably mounted on the base, the joystick base in an upside down T shape comprising a base plate and a shaft upwardly formed from center position of the base plate, a shoulder portion formed on the base plate extended in a circumferential direction, a groove defined between the shoulder portion and the shaft;
a joystick, located on the joystick base, an accommodation cavity defined in the joystick, a shaft hole defined in the joystick, the shaft plugged in the shaft hole;
a reset spring, positioned in the groove and the accommodation cavity;
a first coupled member, rotatably mounted on the base, bent in an arch shape, defining a slit aperture along a lengthwise direction;
a second coupled member, rotatably mounted on the base, located under the first coupled member, arranged in an orthogonal direction relative to the first coupled member, and defining an elongated groove;
a button switch;
a housing, mounted on the base, defining a first through opening in an axial direction for the joystick to stick out, positioning columns formed on the housing assembled with the positioning holes;
a first electronic component, comprising a first substrate and a first rotating part;
a second electronic component, comprising a second substrate and a second rotating part; and
a metal fixing bracket, comprising a main body, a second through opening defined in the main body in accordance with the first through opening for the joystick to stick out, four pins and side pins provided at four corners of the main body, and a containing space defined between the main body and the side pins;
wherein, the joystick upwardly gets through the elongated groove and the slit aperture, the housing is embraced by the metal fixing bracket, the housing and the base are received in the containing space, the housing and the base are positioned and combined by the positioning columns and the positioning holes, the first electronic component and the second electronic component are mounted on the base inside the housing, the first substrate is located in the housing, and the second substrate is in the housing.

2. The game joystick switch assembly of claim 1, wherein the left side wall outwardly extends and defines a receiving space, the button switch is mounted in the receiving space, the button switch is integrated with the base or separated with the base.

3. The game joystick switch assembly of claim 1, wherein a first support and a second support are formed on the base, a first extension arm and a second extension arm are respectively extended from two ends of the first coupled member, one end of the first coupled member is supported on the first support, the second extension arm is rested on the second support.

4. The game joystick switch assembly of claim 3, wherein a third support is formed on the base, a contact portion is outwardly formed from a side wall of the second coupled member in a longitudinal direction, a lug boss is outwardly extended from another side wall, the lug boss is rested on the third support, the contact portion is above the button switch.

5. The game joystick switch assembly of claim 4, wherein a first mounting slot and a second mounting slot are defined in the base, the first electronic component and the second electronic component are respectively plugged in the first mounting slot and the second mounting slot.

6. The game joystick switch assembly of claim 5, wherein slots are defined through two side walls of the second coupled member in a transverse direction, protruded shaft supports are formed on two opposite side walls on the joystick, the shaft supports are spliced by two arc-shaped structures with the same diameter, and the shaft support is assembled with the slot.

7. The game joystick switch assembly of claim 6, wherein the first electronic component is a carbon-film potentiometer, the first rotating part is mounted on the first extension arm, the second electronic component is a carbon-film potentiometer, an arm portion is extended from the lug boss.

* * * * *